US012747184B2

(12) United States Patent
Dittmer et al.

(10) Patent No.: US 12,747,184 B2
(45) Date of Patent: Sep. 29, 2026

(54) LITHIUM SILICATE GLASS CERAMIC COMPRISING COPPER

(71) Applicant: Ivoclar Vivadent AG, Schaan (LI)

(72) Inventors: Marc Dittmer, Feldkirch (AT); Markus Rampf, Seewis-Dorf (CH); Christian Ritzberger, Grabs (CH); Katrin Sulser, Trübbach (CH)

(73) Assignee: Ivoclar Vivadent AG, Schaan (LI)

( * ) Notice: Subject to any disclaimer, the term of this patent is extended or adjusted under 35 U.S.C. 154(b) by 806 days.

(21) Appl. No.: 18/068,277

(22) Filed: Dec. 19, 2022

(65) Prior Publication Data

US 2023/0202905 A1 Jun. 29, 2023

(30) Foreign Application Priority Data

Dec. 23, 2021 (EP) .................................... 21217414

(51) Int. Cl.
*C03C 3/083* (2006.01)
*C03C 3/091* (2006.01)
*C03C 4/00* (2006.01)

(52) U.S. Cl.
CPC .............. *C03C 3/083* (2013.01); *C03C 3/091* (2013.01); *C03C 4/0021* (2013.01); *C03C 4/0028* (2013.01)

(58) Field of Classification Search
CPC ....... C03C 3/083; C03C 3/091; C03C 4/0021; C03C 4/0028; C03C 2205/06; A61K 6/833
See application file for complete search history.

(56) References Cited

U.S. PATENT DOCUMENTS

| | | | | |
|---|---|---|---|---|
| 2,971,853 | A * | 2/1961 | Stookey | C03C 10/0027 501/13 |
| 7,141,520 | B2 | 11/2006 | Zimmer et al. | |
| 7,157,149 | B2 | 1/2007 | Belykh et al. | |
| 7,262,144 | B2 | 8/2007 | Schreder et al. | |
| 8,283,268 | B2 | 10/2012 | Schneider et al. | |
| 2005/0142077 | A1 | 6/2005 | Zimmer et al. | |
| 2018/0244564 | A1 | 8/2018 | Ritzberger et al. | |
| 2020/0262738 | A1 | 8/2020 | Hengst et al. | |
| 2020/0317561 | A1 | 10/2020 | Arnold et al. | |
| 2020/0377404 | A1* | 12/2020 | Beall | C03C 4/02 |

FOREIGN PATENT DOCUMENTS

| | | | | |
|---|---|---|---|---|
| CN | 106746675 | A * | 5/2017 | A61K 6/833 |
| EP | 0153026 | A1 | 8/1985 | |
| EP | 0810586 | A1 | 12/1997 | |
| EP | 1688397 | A1 | 8/2006 | |

OTHER PUBLICATIONS

CN106746675A machine translation (Year: 2017).*
Elbatal, H.A., et al., Thermal, structure and morphological properties of lithium disilicate glasses doped with copper oxide and their glass-ceramic derivatives, Journal of Non-Crystalline Solids, Jun. 7, 2012, vol. 358, pp. 1806-1813.
Dittmer, M., Glaser und Glaskeramiken im System MgO—Al2O3—SiO2 mit ZrO2als Keimbildner, University of Jena Dissertation, 2011, 139 pages.

* cited by examiner

*Primary Examiner* — Cameron K Miller
(74) *Attorney, Agent, or Firm* — Ann M. Knab; Thad McMurray

(57) ABSTRACT

Lithium silicate glass ceramics and precursors thereof are described, which comprise copper and are characterized by very good mechanical and optical properties and can be used in particular as restorative materials in dentistry.

18 Claims, No Drawings

LITHIUM SILICATE GLASS CERAMIC COMPRISING COPPER

CROSS-REFERENCE TO RELATED APPLICATIONS

This application claims priority to European Patent Application No. 21217414.8 filed on Dec. 23, 2021, the disclosure of which is incorporated herein by reference in its entirety.

TECHNICAL FIELD

The invention relates to lithium silicate glass ceramic comprising copper, which is particularly suitable for use in dentistry and preferably for producing dental restorations, and to precursors for producing this glass ceramic.

BACKGROUND

Glass ceramics containing copper are known from the prior art. DE 103 04 382 and corresponding U.S. Pat. No. 7,262,144 B2, which US patent is hereby incorporated by reference in its entirety, describe photo-structurable bodies made of glass or glass ceramic in which refractive index changes are caused by irradiation with light. The bodies can optionally contain photosensitive elements such as Cu, Ag, Au, Ce and Eu to generate suitable absorption centers. In particular, the bodies are used as optical devices, such as waveguides and gratings. However, all of the specified glasses and glass ceramics contain very high levels of antimony oxide or arsenic oxide, which are harmful to health. Therefore, they are not suitable for use in the medical field and especially in dentistry.

EP 1 985 591 and corresponding U.S. Pat. No. 8,283,268 B2, which US patent is hereby incorporated by reference in its entirety, describe glass ceramics which can be colored by metal colloids. Possible metal colloid formers are compounds of the metals Au, Ag, As, Bi, Nb, Cu, Fe, Pd, Pt, Sb and Sn. The glass ceramics are, in particular, lithium aluminosilicate glass ceramics or magnesium aluminosilicate glass ceramics containing high amounts of aluminum oxide of at least 18.0 wt.-% and significant amounts of antimony oxide and arsenic oxide, which are harmful to health.

WO 03/050053 and corresponding US 2005142077, which US published application is hereby incorporated by reference in its entirety, and WO 03/050051 and corresponding U.S. Pat. No. 7,141,520, which US patent is hereby incorporated by reference in its entirety, describe antimicrobial glass ceramic powders which can be used in the field of dental care, for example as a component of mouthwash, toothpaste or dental floss. To enhance the antimicrobial properties, antimicrobially active ions such as Ag, Au, I, Ce, Cu, Zn and Sn may be present. The glass ceramics have alkali earth alkali silicates and/or alkaline earth silicates, in particular NaCa silicates and Ca silicates, as the main crystalline phase.

WO 2005/058768 and corresponding U.S. Pat. No. 7,157,149, which US patent is hereby incorporated by reference in its entirety, disclose bodies of lithium aluminosilicate glass ceramics, which are particularly suitable for the manufacture of cooking hobs. The bodies have a surface layer with a higher content of crystallization-promoting chemical elements from the group of Zn, Cu, Zr, La, Nb, Y, Ti, Ge, V and Sn, whereby a higher degree of crystallization is produced in the surface layer.

EP 1 688 397 describes lithium silicate glass ceramics containing small amounts of zinc oxide as well as high amounts of 2.0 to 5.0 wt.-% nucleating agent. The nucleating agent for forming lithium metasilicate is in particular selected from $P_2O_5$ and compounds of the elements Pt, Ag, Cu and W and it is preferably $P_2O_5$. Accordingly, $P_2O_5$ is also used as the nucleating agent in all the specifically disclosed glass ceramics, which, in addition to lithium silicate, also leads to the formation of lithium phosphate as crystal phase. However, lithium phosphate crystals can impair the mechanical and/or optical properties of lithium silicate glass ceramics.

From H. A. Elbatal et al. in the Journal of Non-Crystalline Solids 358 (2012) 1806-1813, studies of lithium silicate glasses and glass ceramics doped with copper oxide are known. References to any application of these glasses and glass ceramics, let alone as dental materials and in particular as dental restorative materials, are not given.

In summary, the known glass ceramics do not possess the properties desirable for a dental restorative material or they contain high amounts of $P_2O_5$, which can lead to the formation of undesirable crystal phases, such as phosphate phases or cristobalite, which in turn can impair in particular the mechanical and/or optical properties desired for a restorative material.

SUMMARY

The invention is therefore based on the problem of providing a glass ceramic with a combination of very good mechanical and optical properties. The glass ceramic should also be easy to process into dental restorations and thus be excellently suited as a restorative dental material.

This problem is solved by the lithium silicate glass ceramic according to the claims. Also subject of the invention are the starting glass according to the claims, the processes according to the claims, and the use.

DETAILED DESCRIPTION

The lithium silicate glass ceramic according to the invention is characterized in that it comprises 0.001 to 1.0 wt.-% copper, calculated as CuO. In particular, the glass ceramic comprises 0.05 to 0.7, preferably 0.06 to 0.5 and especially preferably 0.07 to 0.35 wt.-% copper, calculated as CuO.

In a particularly preferred embodiment, the copper is present at least in part as elemental copper in the glass ceramic. Its presence can be detected in particular by scanning electron microscopy (SEM) or transmission electron microscopy (TEM) or by X-ray diffraction studies. A red coloration of the glass ceramic also indicates the presence of elemental copper.

It is preferred that the elemental copper is present in the form of particles which preferably have an average size D50 of 0.1 to 100 nm, in particular 1 to 70 nm and particularly preferably 2 to 50 nm, as determined from at least 3 particles by electron microscopy.

In another preferred embodiment at least 65%, preferably at least 75% and particularly preferably at least 90% of the copper particles have a size that is in the range of 0.1 to 100 nm, in particular 1 to 70 nm and particularly preferably 2 to 50 nm, as determined from at least 3 particles by electron microscopy.

The size of elemental copper particles is preferably determined by transmission electron microscopy or scanning electron microscopy and particularly preferably by scanning electron microscopy.

Surprisingly, the glass ceramic according to the invention shows an advantageous combination of mechanical and optical properties desirable for a restorative dental material. The glass ceramic has a high strength and fracture toughness, and it can be easily given the shape of a dental restoration in particular by machining.

It is surprising that the use of $P_2O_5$ as the usual nucleating agent for lithium silicate glass ceramics is not necessary to achieve these properties. It is assumed that in the glass ceramic according to the invention the copper present serves as the nucleating agent. It is particularly surprising that even small amounts of copper are effective.

The glass ceramic according to the invention can also have very high amounts of lithium disilicate crystal phase, in particular more than 65 wt.-%, and it is again assumed that the copper present as nucleating agent is essentially responsible for this. Such high contents of lithium disilicate crystal phase can usually not be produced when $P_2O_5$ is used as nucleating agent.

Further, the glass ceramic according to the invention can be produced by using very short crystallization times from the corresponding starting glass, which is an additional significant advantage of the glass ceramic.

The glass ceramic according to the invention also preferably has only small amounts of further crystal phases, e.g. lithium phosphate or cristobalite. The formation of large amounts of such further crystal phases frequently occurs with the use of large amounts of $P_2O_5$ as nucleating agent, which has been common up to now, and these further crystal phases can have a negative effect on the mechanical and/or optical properties of lithium silicate glass ceramics. In addition, lithium is consumed by the formation of lithium phosphate crystals and is thus no longer available for the formation of lithium silicate. It is the lithium silicate that plays an essential role, especially for the excellent mechanical properties of lithium silicate glass ceramics. Accordingly, the glass ceramic according to the invention is also advantageous in this respect.

The glass ceramic according to the invention comprises in particular 67.0 to 89.0, preferably 68.0 to 82.0 and particularly preferably 70.0 to 81.0 wt.-% $SiO_2$.

It is further preferred that the glass ceramic according to the invention comprises 7.0 to 22.0, preferably 13.0 to 19.0 and particularly preferably 14.0 to 17.0 wt.-% $Li_2O$. It is assumed that $Li_2O$ also lowers the viscosity of the glass matrix and thus promotes crystallization of the desired crystal phases.

In a further preferred embodiment, the glass ceramic according to the invention comprises 0.002 to 1.5, in particular 0.05 to 1.0, preferably 0.1 to 0.8 and particularly preferably 0.1 to 0.6 wt.-% tin, calculated as SnO.

Tin is assumed to act as a reducing agent for copper cations and to promote the formation of elemental copper in the glass ceramic if it is present during the manufacture of the glass ceramic, e.g. in starting materials used for this purpose, particularly in the form of SnO or $SnO_2$.

It is also preferred that the glass ceramic comprises 1.0 to 11.0 and preferably 1.5 to 7.0 wt.-% oxide of monovalent elements $Me^{I}_2O$ selected from the group of $K_2O$, $Na_2O$, $Rb_2O$, $Cs_2O$ and mixtures thereof.

Particularly preferably, the glass ceramic comprises at least one and, in particular, all of the following oxides of monovalent elements $Me^{I}_2O$ in the amounts indicated:

| Component | Wt.-% |
|---|---|
| $K_2O$ | 0 to 11.0 |
| $Na_2O$ | 0 to 5.0 |
| $Rb_2O$ | 0 to 8.0 |
| $Cs_2O$ | 0 to 6.0. |

In a particularly preferred embodiment, the glass ceramic according to the invention comprises 0.5 to 6.0, preferably 1.0 to 4.5, and especially preferably 1.5 to 4.0 wt.-% $K_2O$.

Furthermore, it is preferred that the glass ceramic comprises 0 to 10.0, preferably 1.0 to 9.0, and particularly preferably 2.0 to 7.0 wt.-% oxide of divalent elements $Me^{II}O$ selected from the group of CaO, MgO, SrO, ZnO and mixtures thereof.

In another preferred embodiment, the glass ceramic comprises less than 2.0 wt.-% of BaO. In particular, the glass ceramic is substantially free of BaO.

Preferably, the glass ceramic comprises at least one, and in particular all, of the following oxides of divalent elements $Me^{II}O$ in the amounts indicated:

| Component | Weight % |
|---|---|
| CaO | 0 to 9.0, in particular 1.0 to 9.0 |
| MgO | 0 to 5.0, in particular 0.5 to 5.0 |
| SrO | 0 to 10.0, in particular 1.0 to 10.0 |
| ZnO | 0 to 7.0, in particular 0.5 to 6.0 |

Further, a glass ceramic is preferred which comprises 0.1 to 12.0, preferably 1.0 to 9.0, and most preferably 2.0 to 8.0 wt.-% oxide of trivalent elements $Me^{III}_2O_3$ selected from the group of $Al_2O_3$, $B_2O_3$, $Y_2O_3$, $La_2O_3$, $Ga_2O_3$, $In_2O_3$ and mixtures thereof.

Particularly preferably, the glass ceramic comprises at least one and, in particular, all of the following oxides of trivalent elements $Me^{III}_2O_3$ in the amounts indicated:

| Component | Wt.-% |
|---|---|
| $Al_2O_3$ | 0.1 to 6.0 |
| $B_2O_3$ | 0 to 3.0 |
| $Y_2O_3$ | 0 to 9.0 |
| $La_2O_3$ | 0 to 12.0 |
| $Ga_2O_3$ | 0 to 3.0 |
| $In_2O_3$ | 0 to 5.0 |

In a particularly preferred embodiment, the glass ceramic comprises 0.1 to 5.0, preferably 0.5 to 4.0, and more preferably 0.9 to 3.0 wt.-% $Al_2O_3$.

Furthermore, a glass ceramic is preferred, which comprises 0 to 10.0 and particularly preferably 0 to 8.0 wt.-% oxide of tetravalent elements $Me^{IV}O_2$ selected from the group of $ZrO_2$, $TiO_2$, $GeO_2$ and mixtures thereof.

Particularly preferably, the glass ceramic comprises at least one and, in particular, all of the following oxides of tetravalent elements $Me^{IV}O_2$ in the amounts indicated:

| Component | Wt.-% |
|---|---|
| $ZrO_2$ | 0 to 6.0 |
| $TiO_2$ | 0 to 6.0 |
| $GeO_2$ | 0 to 9.0 |

In another preferred embodiment, the glass ceramic comprises 0 to 10.0, preferably 0 to 8.0 wt.-% oxide of pentavalent elements $Me^{V}{}_2O_5$ selected from the group consisting of $P_2O_5$, $Ta_2O_5$ and $Nb_2O_5$ and mixtures thereof.

Particularly preferably, the glass ceramic comprises at least one and, in particular, all of the following oxides of pentavalent elements $Me^{V}{}_2O_5$ in the amounts indicated:

| Component | Wt.-% |
|---|---|
| $P_2O_5$ | 0 to 8.0 |
| $Ta_2O_5$ | 0 to 8.0 |
| $Nb_2O_5$ | 0 to 7.0 |

In another preferred embodiment, the glass ceramic comprises less than 7.5, in particular less than 3.5, preferably less than 1.5, more preferably less than 0.5 wt.-% $P_2O_5$ and, particularly preferably, the glass ceramic is substantially free of $P_2O_5$.

In another embodiment, the glass ceramic comprises 0 to 6.0, preferably 0 to 5.0 wt.-% oxide of hexavalent element $Me^{VI}O_3$ selected from the group consisting of $WO_3$, $MoO_3$ and mixtures thereof.

Particularly preferably, the glass ceramic comprises at least one, and in particular all, of the following oxides $Me^{VI}O_3$ in the amounts indicated:

| Component | Wt.-% |
|---|---|
| $WO_3$ | 0 to 5.0 |
| $MoO_3$ | 0 to 6.0 |

In a further embodiment, the glass ceramic according to the invention comprises 0 to 1.0 and, in particular 0 to 0.5 wt.-% fluorine.

Particularly preferred is a glass ceramic which comprises at least one, and preferably all, of the following components in the amounts indicated:

| Component | Wt.-% |
|---|---|
| $SiO_2$ | 67.0 to 89.0 |
| $Li_2O$ | 7.0 to 22.0 |
| Copper, calculated as CuO, | 0.001 to 1.0 |
| Tin, calculated as SnO, | 0.002 to 1.5 |
| $Me^{I}{}_2O$ | 1.0 to 11.0 |
| $Me^{II}O$ | 0 to 10.0 |
| $Me^{III}{}_2O_3$ | 0.1 to 12.0 |
| $Me^{IV}O_2$ | 0 to 10.0 |
| $Me^{V}{}_2O_5$ | 0 to 10.0 |
| $Me^{VI}O_3$ | 0 to 6.0 |
| Fluorine | 0 to 1.0, |

where $Me^{I}{}_2O$, $Me^{II}O$, $Me^{III}{}_2O_3$, $Me^{IV}O_2$, $Me^{V}{}_2O_5$ and $Me^{VI}O_3$ have the meanings given above.

In another particularly preferred embodiment, the glass ceramic comprises at least one, and preferably all, of the following components in the amounts indicated:

| Component | Wt.-% |
|---|---|
| $SiO_2$ | 68.0 to 82.0 |
| $Li_2O$ | 13.0 to 19.0 |
| Copper, calculated as CuO, | 0.05 to 0.7 |
| Tin, calculated as SnO, | 0.05 to 1.0 |
| $K_2O$ | 0 to 11.0 |
| $Na_2O$ | 0 to 5.0 |
| $Rb_2O$ | 0 to 8.0 |
| $Cs_2O$ | 0 to 6.0 |

-continued

| Component | Wt.-% |
|---|---|
| CaO | 0 to 9.0 |
| MgO | 0 to 5.0 |
| SrO | 0 to 10.0 |
| ZnO | 0 to 7.0 |
| $Al_2O_3$ | 0.1 to 6.0 |
| $B_2O_3$ | 0 to 3.0 |
| $Y_2O_3$ | 0 to 9.0 |
| $La_2O_3$ | 0 to 12.0 |
| $Ga_2O_3$ | 0 to 3.0 |
| $In_2O_3$ | 0 to 5.0 |
| $ZrO_2$ | 0 to 6.0 |
| $TiO_2$ | 0 to 6.0 |
| $GeO_2$ | 0 to 9.0 |
| $P_2O_5$ | 0 to 8.0 |
| $Ta_2O_5$ | 0 to 8.0 |
| $Nb_2O_5$ | 0 to 7.0 |
| $WO_3$ | 0 to 5.0 |
| $MoO_3$ | 0 to 6.0 |
| Fluorine | 0 to 0.5. |

Some of the above components may serve as coloring agents and/or fluorescent agents. The glass ceramic according to the invention may furthermore comprise further coloring and/or fluorescent agents. These may in particular be selected from further inorganic pigments and/or oxides of d and f elements, such as the oxides of Mn, Fe, Co, Pr, Nd, Tb, Er, Dy, Eu and Yb. In a preferred embodiment, Ag, Ag oxide or Ag halide, such as AgCl, AgBr or AgI, are used. With the aid of these coloring and fluorescent agents, it is possible to easily color the glass ceramic to imitate the desired optical properties, in particular of natural dental material.

In a preferred embodiment of the glass ceramic, the molar ratio of $SiO_2$ to $Li_2O$ is in the range of 1.5 to 6.0, preferably 1.7 to 5.5, and particularly preferably 2.0 to 4.0.

It is further preferred that the glass ceramic according to the invention comprises lithium disilicate or lithium metasilicate as the main crystal phase.

The term "main crystal phase" refers to the crystal phase which has the highest weight proportion of all crystal phases present in the glass ceramic. The amounts of the crystal phases are determined in particular by the Rietveld method. A suitable procedure for the quantitative analysis of the crystal phases by means of the Rietveld method is described, for example, in the dissertation by M. Dittmer "Glaser and Glaskeramiken im System $MgO—Al_2O_3—SiO_2$ mit $ZrO_2$als Keimbildner", University of Jena 2011.

It is preferred that the glass ceramic according to the invention comprises at least 10 wt.-%, preferably at least 15 wt.-% and particularly preferably at least 20 wt.-% lithium metasilicate crystals. Particularly preferably, the glass ceramic according to the invention comprises 10 to 50 wt.-%, preferably 15 to 45 wt.-% and especially preferably 20 to 40 wt.-% lithium metasilicate crystals.

In another embodiment, it is preferred that the glass ceramic according to the invention comprises at least 50 wt.-%, preferably at least 55 wt.-% and particularly preferably at least 60 wt.-% lithium disilicate crystals. Particularly preferably, the glass ceramic according to the invention comprises 50 to 85 wt.-% preferably 55 to 80 wt.-% and especially preferably 60 to 78 wt.-% lithium disilicate crystals.

In a preferred embodiment, the lithium disilicate crystals in the glass ceramic according to the invention have an average size in the range of 10 to 3000 nm, in particular in the range of 50 to 2000 nm, particularly preferably in the range of 100 to 1200 nm.

The average size of the lithium disilicate crystals can be determined from SEM images. To this end, a surface of a respective glass ceramic is polished (<0.5 μm), etched with 40% HF vapor for at least 30 s, and then sputtered with an Au—Pd layer. SEM images from the pretreated surfaces are recorded using a scanning electron microscope, such as a Supra 40VP (Zeiss, Oberkochen, Germany). The SEM images are then processed to improve the contrast between crystals and glass phase using a common image processing program. From these images, the average size can be determined, for example by using Olympus Stream Motion 2.4 image analysis software (Olympus Corporation, Tokyo, Japan).

The glass ceramic according to the invention is characterized by particularly good mechanical and optical properties and it can be formed by heat treatment of a corresponding starting glass or a corresponding starting glass with nuclei. These materials can therefore serve as precursors for the glass ceramic according to the invention.

The type and, in particular, the amount of crystal phases formed can be controlled by the composition of the starting glass as well as the heat treatment applied to produce the glass ceramic from the starting glass. The examples illustrate this by varying the composition of the starting glass and the heat treatment applied.

The glass ceramic has a high biaxial fracture strength of preferably at least 200 MPa and particularly preferably at least 300 MPa. The biaxial fracture strength was determined in accordance with ISO 6872 (2008) (piston-on-three-balls test).

The glass ceramic also has a high fracture toughness of preferably at least 1.5 $MPa \cdot m^{0.5}$, particularly preferably at least 2.0 $MPa \cdot m^{0.5}$ and most preferably at least 2.5 $MPa \cdot m^{0.5}$. The fracture toughness was determined according to ISO 6872 (2015) (SEVNB method).

The glass ceramic has a translucency of in particular at least 50, preferably at least 55 and particularly preferably at least 60. The translucency was determined in the form of the contrast value (CR value) according to British Standard BS 5612.

Further, the glass ceramic has a high chemical stability measured as acid solubility according to ISO 6872 (2015) of preferably less than 100 $g/cm^2$.

The particular combination of properties present in the glass ceramic according to the invention even allows it to be used as a dental material and, in particular, as a material for producing dental restorations.

The invention also relates to precursors of corresponding composition from which the glass ceramic according to the invention can be produced by heat treatment. These precursors are a correspondingly composed starting glass and a correspondingly composed starting glass with nuclei. The term "corresponding composition" means that these precursors comprise the same components in the same amounts as the glass ceramic, the components being calculated as oxides as is usual for glasses and glass ceramics, with the exception of fluorine.

The invention therefore also relates to a starting glass comprising the components of the glass ceramic according to the invention.

The starting glass according to the invention therefore comprises, in particular, suitable amounts of $SiO_2$, $Li_2O$ and copper, which are required to form the glass ceramic according to the invention. Further, the starting glass may also comprise other components as indicated above for the glass ceramic according to the invention. All such embodiments are preferred for the components of the starting glass that are also indicated as preferred for the components of the glass ceramic according to the invention.

Particularly preferably, the starting glass is in the form of a monolithic blank obtained by casting a melt of the starting glass into a mold.

The invention also relates to such a starting glass comprising nuclei for the crystallization of lithium silicate, in particular lithium metasilicate and/or lithium disilicate.

In particular, the starting glass is produced by melting a mixture of suitable starting materials, such as carbonates, oxides and halides, at temperatures of in particular about 1400 to 1700° C. for 0.5 to 4 h. The melt can then be poured into water to produce a frit. To achieve a particularly high homogeneity, the glass frit obtained is melted again.

The melt can then be poured into molds to produce blanks of the starting glass, so-called solid glass blanks or monolithic blanks.

It is particularly preferred to use as a starting material an agent for reducing copper cations, in particular an organic compound, preferably sugar, a metal powder, preferably Al- or Fe-powder, or a tin compound, preferably SnO or $SnO_2$. It is assumed that during the production of the glass ceramic, starting with the melting of the starting glass, this reducing agent at least partially causes a reduction of existing copper cations and leads to the preferred formation of elemental copper.

The invention therefore also relates to a process for producing the glass ceramic according to the invention, in which a starting glass is melted from a mixture of starting materials, the mixture comprising an agent for reducing copper cations, in particular an organic compound, preferably sugar, a metal powder, preferably Al- or Fe-powder, or a tin compound, preferably SnO or $SnO_2$, and the starting glass is subjected to at least one heat treatment.

In a preferred embodiment, the molar ratio of the agent, which is present for reducing copper cations, to copper in the mixture of starting materials is in the range of 0.5 to 200, preferably 1 to 80, and particularly preferably 1 to 30.

By heat treatment of the starting glass, the further precursor starting glass with nuclei can first be produced. The lithium silicate glass ceramic according to the invention can then be produced by heat treatment of this further precursor. Alternatively, the glass ceramic according to the invention can be famed by heat treatment of the starting glass.

It is preferred to subject the starting glass to a heat treatment at a temperature of 400 to 600° C., in particular 450 to 550° C. and more preferably 460 to 490° C. for a duration of preferably 5 to 120 min, in particular 10 to 60 min, to produce the starting glass with nuclei for the crystallization of lithium silicate.

It is further preferred to subject the starting glass or the starting glass with nuclei to a heat treatment at a temperature of 500 to 1050° C., preferably 650 to 970° C., for a duration of in particular 5 seconds to 120 min, preferably 1 min to 100 min, more preferably 5 min to 60 min and further preferred 10 min to 30 min, in order to produce the glass ceramic according to the invention.

The invention therefore also relates to a process for producing the glass ceramic according to the invention, in which the starting glass or the starting glass with nuclei is subjected to at least one heat treatment in the range from 500 to 1050° C., preferably 650 to 970° C., for a duration of in particular 5 seconds to 120 min, preferably 1 min to 100 min, more preferably 5 min to 60 min and further preferred 10 min to 30 min.

In a further preferred embodiment, the starting glass or the starting glass with nuclei can first be subjected to a heat treatment at a temperature of 500 to 800° C., preferably 550 to 800° C., for a duration of in particular 5 seconds to 120 min, preferably 1 min to 100 min, particularly preferably 5 min to 60 min and further preferred 10 min to 30 min, in order to produce the glass ceramic according to the invention with lithium metasilicate as the main crystal phase.

The glass ceramic according to the invention with lithium metasilicate as the main crystal phase can then be subjected to a further heat treatment to convert lithium metasilicate crystals into lithium disilicate crystals and, in particular, to form the glass ceramic according to the invention with lithium disilicate as the main crystal phase. Preferably, the glass ceramic is subjected to a further heat treatment at a temperature of 800 to 1050° C., preferably 850 to 1030° C. and more preferably 900 to 970° C., in particular for a duration of 5 seconds to 120 min, preferably 1 min to 100 min, more preferably 5 min to 60 min, further preferred 5 min to 30 min and most preferably 5 to 10 min.

The appropriate conditions of the heat treatments can be determined for a given glass ceramic, for example, by performing X-ray diffraction analyses at different temperatures.

The glass ceramics according to the invention and the glasses according to the invention are present in particular as blanks in any shape and size, e.g. monolithic blanks, such as platelets, cuboids or cylinders. In these forms, they can be easily further processed, e.g. into dental restorations. They can also be in the form of dental restorations, such as inlays, onlays, crowns, veneers, facets or abutments.

Dental restorations, such as bridges, inlays, onlays, crowns, veneers, facets or abutments, can be produced from the glass ceramics according to the invention and the glasses according to the invention. The invention therefore also relates to their use for producing dental restorations. It is preferred that the glass ceramic or glass is given the shape of the desired dental restoration by machining.

Machining is usually carried out by material-removing processes and in particular by milling and/or grinding. It is particularly preferred that the machining is carried out in a CAD/CAM process. The starting glass according to the invention, the starting glass with nuclei according to the invention and the glass ceramic according to the invention can be used for the machining. Preferably, the starting glass with nuclei or the glass ceramic according to the invention with lithium metasilicate as the main crystal phase are used. The glasses and glass ceramics according to the invention can be used in particular in the form of blanks.

Due to the above-described properties of the glass ceramics according to the invention and the glasses according to the invention, they are particularly suitable for use in dentistry. It is therefore also an object of the invention to use the glass ceramics according to the invention or the glasses according to the invention as dental material and preferably for producing dental restorations, such as bridges, inlays, onlays, veneers, abutments, partial crowns, crowns or facets.

The invention thus also relates to a process for producing a dental restoration, in particular a bridge, inlay, onlay, veneer, abutment, partial crown, crown or facet, in which the glass ceramic or glass according to the invention is given the shape of the desired dental restoration by machining, in particular in a CAD/CAM process.

The invention is explained in more detail below by means of nonlimiting examples.

EXAMPLES

Examples 1 to 48—Composition and Crystal Phases

A total of 48 glasses and glass ceramics according to the invention with the composition indicated in Table I were produced by melting of corresponding starting materials to produce starting glasses and their subsequent heat treatment for controlled crystallization.

The applied heat treatments as well as properties of the obtained glass ceramics are also given in Table I. The following meanings apply

| | |
|---|---|
| $T_g$ | Glass transition temperature determined by DSC |
| $T_s$ and $t_s$ | Applied temperature and time for melting of the starting glass |
| $T_{Kb}$ and $t_{Kb}$ | Applied temperature and time for nucleation of starting glass |
| $T_{C1}$ and $t_{C1}$ | Applied temperature and time for first crystallization |
| $T_{C2}$ and $t_{C2}$ | Applied temperature and time for second crystallization |
| $K_{IC}$ | Fracture toughness measured according to ISO 6872 (2015) (SEVNB method) |
| Chem. Stability | Measured as loss in mass according to ISO 6872 (2015) |
| $\sigma_{Biax}$ | Biaxial fracture strength measured according to ISO 6872 (2015) (piston-on-three-balls test). |

In the examples, starting glasses with the compositions given in Table I were first melted on a 100 to 200 g scale from common raw materials at temperature $T_s$ for duration $t_s$, with very good melting being possible without formation of bubbles or streaks. In Examples 10, 14 and 48, sugar was also added to the raw materials as a reducing agent.

Glass frits were produced by pouring the starting glasses into water, which optionally were subsequently melted a second time at temperature $T_s$ for duration $t_s$ for homogenization. The resulting melts of the starting glass were then poured into a graphite mold to produce monolithic glass blocks.

A first heat treatment of the obtained glass blocks at temperature $T_{Kb}$ for duration $t_{Kb}$ resulted in relaxation of the glasses and formation of glasses with nuclei. These nucleated glasses crystallized by further heat treatment at temperature $T_{C1}$ for duration $t_{C1}$ to form glass ceramics with lithium metasilicate or lithium disilicate as the main crystalline phase, as determined by X-ray diffraction studies at room temperature. In some cases, further heat treatment at temperature $T_{C2}$ for duration $t_{C2}$ was subsequently carried out, resulting in glass ceramics with lithium disilicate as the main crystalline phase.

The amounts of the crystal phases were determined by X-ray diffraction. For this purpose, powders of the respective glass ceramics were prepared by grinding and sieving (<45 μm) and admixed with $Al_2O_3$ (Alfa Aesar, product no. 42571) as internal standard in a ratio of 80 wt.-% glass ceramic to 20 wt.-% $Al_2O_3$. The mixture was slurried with acetone to achieve the best possible mixing. The mixture was then dried at about 80° C. A diffractogram was then recorded using a Bruker D8 Advance diffractometer in the range to 100° 2θ using CuKα radiation and a step size of 0.014° 2θ. This diffractogram was then analyzed using Bruker's TOPAS 5.0 software using the Rietveld method. By comparing the intensities of the peaks with those of $Al_2O_3$, the phase fractions were determined.

To determine the biaxial fracture strengths according to ISO 6872 (2015) (piston-on-three-balls test), holders were bonded to blocks of the relaxed and nucleated glasses, and these blocks were subsequently machined using a CAD/

CAM grinding unit (Sirona InLab). The grinding process was performed using diamond-coated grinding tools. The resulting platelets were subjected to the heat treatment indicated in the table at temperature $T_{C1}$ for duration $t_{C1}$, and then the crystallized platelets were polished to a thickness of 1.2±0.2 mm using diamond wheels. The biaxial fracture strength was determined on the specimens thus prepared.

High biaxial fracture strengths in the range of 330 to 780 MPa were determined for the glass ceramics produced.

Fracture toughnesses was determined according to ISO 6872 (2015) (SEVNB method), and high fracture toughnesses in the range of 2 to 3.2 MPa·$m^{0.5}$ were determined for the produced glass ceramics.

Chemical stability testing was performed according to ISO 6872 (2015), and the glass ceramics produced showed an acid solubility of less than 100 g/$cm^2$.

Dental crowns were fabricated from the generated glasses and glass ceramics by CAD/CAM supported machining, and these crowns were optionally further subjected to final crystallization under the conditions indicated in Table I.

TABLE I

| | Example no. | | | | |
|---|---|---|---|---|---|
| Composition | 1 Wt.-% | 2 Wt.-% | 3 Wt.-% | 4 Wt.-% | 5 Wt.-% |
| $SiO_2$ | 75.89 | 78.29 | 78.29 | 79.05 | 79.05 |
| $Li_2O$ | 15.72 | 16.20 | 16.20 | 16.37 | 16.37 |
| CuO | 0.30 | 0.30 | 0.30 | 0.30 | 0.30 |
| SnO | 0.50 | 0.51 | 0.51 | 0.51 | 0.51 |
| $K_2O$ | 4.04 | 1.79 | 1.79 | 1.82 | 1.82 |
| $Al_2O_3$ | 3.55 | 2.91 | 2.91 | 1.95 | 1.95 |
| Σ | 100.0000 | 100.0000 | 100.0000 | 100.0000 | 100.0000 |
| $T_g$/° C. | 461.5 | 454.2 | 454.2 | 454.2 | 454.2 |
| $T_s$/° C. | 1500 | 1500 + 1500 | 1500 + 1500 | 1500 + 1500 | 1500 + 1500 |
| $t_s$/min. | 60 | 60 + 60 | 60 + 60 | 60 + 60 | 60 + 60 |
| $T_{Kb}$/° C. | 480 | 480 | 480 | 480 | 480 |
| $t_{Kb}$/min | 10 | 10 | 10 | 10 | 10 |
| $T_{C1}$/° C. | 880 | 830 | 950 | 830 | 860 |
| $t_{C1}$/min. | 10 | 10 | 10 | 10 | 10 |
| $T_{C2}$/° C. | | | | | |
| $t_{C2}$/min. | | | | | |
| Main crystal phase (wt.-%) | $Li_2SiO_3$ (33.7) | $Li_2SiO_3$ | $Li_2Si_2O_5$ | $Li_2SiO_3$ (39.2) | $Li_2Si_2O_5$ (66.2) |
| Other crystal phases (wt.-%) | $Li_2Si_2O_5$ (14.9) Quartz (0.8) | $Li_2Si_2O_5$ Quartz Cristobalite | $Li_2SiO_3$ | $Li_2Si_2O_5$ (14.4) Cristobalite (2.6) | $Li_2SiO_3$ (1.3) Quartz (0.7) |
| Kic(MPa * $m^{0.5}$) | 2.1 ± 0.2 | 2.0 ± 0.4 | 3.0 ± 0.1 | | 3.2 ± 0.1 |
| Chem. stability (μg/$cm^2$) | | 40 | 7 | 54 | |
| $\sigma_{Biax}$ (MPa) | 381 ± 71 | 439 ± 69 | 532 ± 35 | 465 ± 80 | 780 ± 139 |

| | Example no. | | | | |
|---|---|---|---|---|---|
| Composition | 6 Wt.-% | 7 Wt.-% | 8 Wt.-% | 9 Wt.-% | 10 Wt.-% |
| $SiO_2$ | 79.05 | 79.05 | 79.05 | 79.05 | 79.05 |
| $Li_2O$ | 16.37 | 16.37 | 16.37 | 16.37 | 16.37 |
| CuO | 0.30 | 0.30 | 0.30 | 0.30 | 0.30 |
| SnO | 0.51 | 0.51 | 0.51 | 0.51 | 0.51 |
| $K_2O$ | 1.82 | 1.82 | 1.82 | 1.82 | 1.82 |
| $Al_2O_3$ | 1.95 | 1.95 | 1.95 | 1.95 | 1.95 |
| Σ | 100.0000 | 100.0000 | 100.0000 | 100.0000 | 100.0000 |
| $T_g$/° C. | 454.2 | 454.2 | 454.2 | 454.2 | |
| $T_s$/° C. | 1500 + 1500 | 1500 + 1500 | 1500 + 1500 | 1650 + 1650 | 1650 |
| $t_s$/min. | 60 + 60 | 60 + 60 | 60 + 60 | 60 + 60 | 60 |
| $T_{Kb}$/° C. | 480 | 480 | 480 | 480 | 480 |
| $t_{Kb}$/min | 10 | 10 | 10 | 10 | 10 |
| $T_{C1}$/° C. | 950 | 550 | 970 | 950 | 950 |
| $t_{C1}$/min. | 10 | 10 | 1 | 10 | 10 |
| $T_{C2}$/° C. | | 950 | | | |
| $t_{C2}$/min. | | 10 | | | |
| Main crystal phase (wt.-%) | $Li_2Si_2O_5$ (75.4) | $Li_2Si_2O_5$ | $Li_2Si_2O_5$ (73.2) | $Li_2Si_2O_5$ (73.2) | $Li_2Si_2O_5$ (75.1) |
| Other crystal phases (wt.-%) | | | $Li_2SiO_3$ (0.8) | $Li_2SiO_3$ (0.3) | $Li_2SiO_3$ (0.7) |
| Kic(MPa * $m^{0.5}$) | 3.0 ± 0.1 | | 3.2 ± 0.2 | 3.0 ± 0.1 | 2.9 ± 0.2 |
| Chem. stability (μg/$cm^2$) | 7 | | | | |
| $\sigma_{Biax}$ (MPa) | 550 ± 40 | | 543 ± 199 | 594 ± 23 | 756 ± 53 |

TABLE I-continued

| Composition | Example no. 11 Wt.-% | 12 Wt.-% | 13 Wt.-% | 14 Wt.-% | 15 Wt.-% |
|---|---|---|---|---|---|
| $SiO_2$ | 79.83 | 79.42 | 79.56 | 79.56 | 79.56 |
| $Li_2O$ | 16.53 | 16.45 | 16.48 | 16.48 | 16.48 |
| CuO | 0.31 | 0.15 | 0.08 | 0.08 | 0.08 |
| SnO | 0.52 | 0.26 | 0.13 | 0.13 | 0.13 |
| $Na_2O$ | | | | | |
| $K_2O$ | 1.83 | | 1.80 | 1.80 | 1.80 |
| $Cs_2O$ | | | | | |
| ZnO | | | | | |
| $Al_2O_3$ | 0.98 | 3.72 | 1.95 | 1.95 | 1.95 |
| $Y_2O_3$ | | | | | |
| Σ | 100.0000 | 100.0000 | 100.0000 | 100.0000 | 100.0000 |
| $T_g$/° C. | 452.7 | 462 | 451.7 | 465.4 | 451.7 |
| $T_s$/° C. | 1500 + 1500 | 1500 + 1500 | 1500 + 1500 | 1650 | 1500 + 1500 |
| $t_s$/min. | 60 + 60 | 60 + 60 | 60 + 60 | 60 | 60 + 60 |
| $T_{Kb}$/° C. | 480 | 480 | 480 | 480 | 480 |
| $t_{Kb}$/min | 10 | 10 | 10 | 10 | 10 |
| $T_{C1}$/° C. | 970 | 920 | 950 | 950 | 550 |
| $t_{C1}$/min. | 10 | 10 | 10 | 10 | 10 |
| $T_{C2}$/° C. | | | | | 950 |
| $t_{C2}$/min. | | | | | 10 |
| Main crystal phase (wt.-%) | $Li_2Si_2O_5$ | $Li_2Si_2O_5$ | $Li_2Si_2O_5$ (73.0) | $Li_2Si_2O_5$ | $Li_2Si_2O_5$ |
| Other crystal phases (wt.-%) | | $Li_2SiO_3$ Quartz $Li_2O$•$Al_2O_3$•7.5 $SiO_2$ | | | |
| Kic(MPa * $m^{0.5}$) | 3.0 ± 0.1 | | 2.8 ± 0.2 | | |
| Chem. stability (μg/cm$^2$) | 31 | | | | |
| $\sigma_{Biax}$ (MPa) | 494 ± 52 | | 387 ± 42 | | |

| Composition | Example no. 16 Wt.-% | 17 Wt.-% | 18 Wt.-% | 19 Wt.-% | 20 Wt.-% |
|---|---|---|---|---|---|
| $SiO_2$ | 79.56 | 75.80 | 75.45 | 74.70 | 73.11 |
| $Li_2O$ | 16.48 | 15.70 | 15.63 | 15.48 | 15.14 |
| CuO | 0.08 | 0.08 | 0.07 | 0.07 | 0.07 |
| SnO | 0.13 | 0.13 | 0.12 | 0.13 | 0.12 |
| $Na_2O$ | | 4.71 | | | |
| $K_2O$ | 1.80 | 1.72 | 1.71 | 1.69 | 1.66 |
| $Cs_2O$ | | | 5.17 | | |
| ZnO | | | | 6.10 | |
| $Al_2O_3$ | 1.95 | 1.86 | 1.85 | 1.83 | 1.79 |
| $Y_2O_3$ | | | | | 8.11 |
| Σ | 100.0000 | 100.0000 | 100.0000 | 100.0000 | 100.0000 |
| $T_g$/° C. | 451.7 | 428.3 | 459.5 | 453.1 | 482.8 |
| $T_s$/° C. | 1500 + 1500 | 1500 + 1500 | 1500 + 1500 | 1500 + 1500 | 1500 + 1500 |
| $t_s$/min. | 60 + 60 | 60 + 60 | 60 + 60 | 60 + 60 | 60 + 60 |
| $T_{Kb}$/° C. | 480 | 480 | 480 | 480 | 480 |
| $t_{Kb}$/min | 10 | 10 | 10 | 10 | 10 |
| $T_{C1}$/° C. | 970 | 900 | 950 | 950 | 930 |
| $t_{C1}$/min. | 1 | 10 | 10 | 10 | 10 |
| $T_{C2}$/° C. | | | | | |
| $t_{C2}$/min. | | | | | |
| Main crystal phase (wt.-%) | $Li_2Si_2O_5$ | $Li_2Si_2O_5$ | $Li_2Si_2O_5$ | $Li_2Si_2O_5$ | $Li_2Si_2O_5$ |
| Other crystal phases (wt.-%) | | $Li_2SiO_3$ | $Li_2SiO_3$ Quartz | | $Li_2SiO_3$ Quartz |
| Kic(MPa * $m^{0.5}$) | 2.8 ± 0.3 | | | | |
| Chem. stability (μg/cm$^2$) | | | | | |
| $\sigma_{Biax}$ (MPa) | 311 ± 97 | | | | |

| Composition | Example no. 21 Wt.-% | 22 Wt.-% | 23 Wt.-% | 24 Wt.-% | 25 Wt.-% |
|---|---|---|---|---|---|
| $SiO_2$ | 70.56 | 75.67 | 73.79 | 73.29 | 74.77 |
| $Li_2O$ | 14.62 | 15.67 | 15.28 | 15.18 | 15.49 |
| CuO | 0.07 | 0.07 | 0.07 | 0.07 | 0.07 |
| SnO | 0.12 | 0.12 | 0.12 | 0.12 | 0.13 |

TABLE I-continued

| | | | | | |
|---|---|---|---|---|---|
| $K_2O$ | 1.60 | 1.72 | 1.67 | 1.66 | 1.70 |
| $Al_2O_3$ | 1.73 | 1.86 | 1.81 | 1.80 | 1.84 |
| $La_2O_3$ | 11.30 | | | | |
| $ZrO_2$ | | | | | |
| $TiO_2$ | | | | | 6.00 |
| AgCl | | | | | |
| $Ta_2O_5$ | | | | 7.88 | |
| $Nb_2O_5$ | | 4.89 | | | |
| $MoO_5$ | | | | | |
| $WO_3$ | | | | | |
| $P_2O_5$ | | | 7.26 | | |
| Σ | 100.0000 | 100.0000 | 100.0000 | 100.0000 | 100.0000 |
| $T_g$/° C. | 466.8 | 474.5 | 465.2 | 467.3 | 480.4 |
| $_s$/° C. | 1500 + 1500 | 1500 + 1500 | 1500 + 1500 | 1500 + 1500 | 1500 + 1500 |
| $t_s$/min. | 60 + 60 | 60 + 60 | 60 + 60 | 60 + 60 | 60 + 60 |
| $T_{Kb}$/° C. | 480 | 480 | 480 | 480 | 480 |
| $t_{Kb}$/min | 10 | 10 | 10 | 10 | 10 |
| $T_{C1}$/° C. | 920 | 920 | 950 | 950 | 910 |
| $t_{C1}$/min. | 10 | 10 | 10 | 10 | 10 |
| $T_{C2}$/° C. | | | | | |
| $t_{C2}$/min. | | | | | |
| Main crystal phase (wt.-%) | $Li_2Si_2O_5$ | $Li_2Si_2O_5$ | $Li_2Si_2O_5$ | $Li_2Si_2O_5$ | $Li_2Si_2O_5$ |
| Other crystal phases (wt.-%) | $Li_2SiO_3$<br>$La_2Si_2O_7$ | $(Li_{0.938}Nb_{0.012})NbO_3$<br>Quartz<br>$Li_2SiO_3$ | Cristobalite<br>$Li_3PO_4$ | $LiTaO_3$<br>Quartz | $TiO_2$ |
| Kic (MPa * $m^{0.5}$) | 3.1 ± 0.1 | | 2.5 ± 0.2 | | |
| Chem. stability (μg/$cm^2$) | | | | | |
| $\sigma_{Biax}$ (MPa) | 331 ± 85 | | 557 ± 58 | | |

| | Example no. | | | | |
|---|---|---|---|---|---|
| Composition | 26<br>Wt.-% | 27<br>Wt.-% | 28<br>Wt.-% | 29<br>Wt.-% | 30<br>Wt.-% |
| $SiO_2$ | 75.9 | 75.32 | 76.15 | 79.47 | 79.5589 |
| $Li_2O$ | 15.72 | 15.6 | 15.77 | 16.46 | 16.48 |
| CuO | 0.07 | 0.07 | 0.07 | 0.08 | 0.08 |
| SnO | 0.13 | 0.12 | 0.12 | 0.13 | 0.13 |
| $K_2O$ | 1.72 | 1.71 | 1.73 | 1.80 | 1.80 |
| $Al_2O_3$ | 1.86 | 1.85 | 1.87 | 1.95 | 1.95 |
| $La_2O_3$ | | | | | |
| $ZrO_2$ | 4.60 | | | | |
| $TiO_2$ | | | | | |
| AgCl | | | | 0.11 | 0.0011 |
| $Ta_2O_5$ | | | | | |
| $Nb_2O_5$ | | | | | |
| $MoO_5$ | | 5.33 | | | |
| $WO_3$ | | | 4.29 | | |
| $P_2O_5$ | | | | | |
| Σ | 100.0000 | 100.0000 | 100.0000 | 100.0000 | 100.0000 |
| $T_g$/° C. | 468.4 | 460.5 | 464.6 | 454.6 | 454.9 |
| $_s$/° C. | 1500 + 1500 | 1500 + 1500 | 1500 + 1500 | 1500 + 1500 | 1500 + 1500 |
| $t_s$/min. | 60 + 60 | 60 + 60 | 60 + 60 | 60 + 60 | 60 + 60 |
| $T_{Kb}$/° C. | 480 | 480 | 480 | 480 | 480 |
| $t_{Kb}$/min | 10 | 10 | 10 | 10 | 10 |
| $T_{C1}$/° C. | 950 | 950 | 950 | 950 | 500 |
| $t_{C1}$/min. | 10 | 10 | 10 | 10 | 60 |
| $T_{C2}$/° C. | | | | | 970 |
| $t_{C2}$/min. | | | | | 10 |
| Main crystal phase (wt.-%) | $Li_2Si_2O_5$ | $Li_2Si_2O_5$ | $Li_2Si_2O_5$ | $Li_2Si_2O_5$ | $Li_2Si_2O_5$ |
| Other crystal phases (wt.-%) | $Li_2SiO_3$<br>Quartz | $Li_2MoO_4$<br>Quartz<br>Cristobalite | $Li_6W_2O_9$ | | |
| Kic (MPa * $m^{0.5}$) | | | | | |
| Chem. stability (μg/$cm^2$) | | | | | |
| $\sigma_{Biax}$ (MPa) | | | | | |

| | Example no. | | | | |
|---|---|---|---|---|---|
| Composition | 31<br>Wt.-% | 32<br>Wt.-% | 33<br>Wt.-% | 34<br>Wt.-% | 35<br>Wt.-% |
| $SiO_2$ | 79.54 | 78.69 | 77.87 | 79.32 | 79.35 |
| $Li_2O$ | 16.47 | 16.31 | 16.13 | 16.43 | 16.44 |

TABLE I-continued

| | | | | | |
|---|---|---|---|---|---|
| CuO | 0.08 | 0.08 | 0.07 | 0.08 | 0.08 |
| SnO | 0.13 | 0.13 | 0.13 | 0.13 | 0.13 |
| $K_2O$ | 1.80 | 1.79 | 1.77 | 1.80 | 1.80 |
| MgO | | | | | |
| CaO | | | | | |
| SrO | | | | | |
| $Al_2O_3$ | 1.95 | 1.94 | 1.92 | 1.95 | 1.95 |
| $Er_2O_3$ | | | | 0.29 | |
| $MnO_2$ | 0.03 | | | | |
| $Dy_2O_3$ | | 1.06 | | | |
| $Tb_4O_7$ | | | 2.11 | | |
| $Pr_2O_3$ | | | | | 0.25 |
| $Nd_2O_3$ | | | | | |
| Σ | 100.0000 | 100.0000 | 100.0000 | 100.0000 | 100.0000 |
| $T_g$/° C. | 455.8 | 461.7 | 463.7 | 463.5 | 460.3 |
| $T_s$/° C. | 1500 + 1500 | 1500 + 1500 | 1500 + 1500 | 1500 + 1500 | 1500 + 1500 |
| $t_s$/min. | 60 + 60 | 60 + 60 | 60 + 60 | 60 + 60 | 60 + 60 |
| $T_{Kb}$/° C. | 480 | 480 | 480 | 480 | 480 |
| $t_{Kb}$/min | 10 | 10 | 10 | 10 | 10 |
| $T_{C1}$/° C. | 950 | 950 | 950 | 970 | 970 |
| $t_{C1}$/min. | 10 | 10 | 10 | 10 | 10 |
| $T_{C2}$/° C. | | | | | |
| $t_{C2}$/min. | | | | | |
| Main crystal phase (wt.-%) | $Li_2Si_2O_5$ | $Li_2Si_2O_5$ | $Li_2Si_2O_5$ | $Li_2Si_2O_5$ | $Li_2Si_2O_5$ |
| Other crystal phases (wt.-%) | | | | | |
| Kic (MPa * $m^{0.5}$) | | | | | |
| Chem. stability (µg/$cm^2$) | | | | | |
| $\sigma_{Biax}$ (MPa) | | 390 ± 116 | | | |

| | Example no. | | | | |
|---|---|---|---|---|---|
| Composition | 36 Wt.-% | 37 Wt.-% | 38 Wt.-% | 39 Wt.-% | 40 Wt.-% |
| $SiO_2$ | 77.52 | 78.73 | 72.51 | 76.94 | 73.36 |
| $Li_2O$ | 16.07 | 16.30 | 15.02 | 15.94 | 15.2 |
| CuO | 0.08 | 0.45 | 0.08 | 0.08 | 0.07 |
| SnO | 0.13 | 0.77 | 0.13 | 0.13 | 0.12 |
| $K_2O$ | 1.77 | 1.81 | 1.79 | 1.82 | 1.74 |
| MgO | | | | 3.12 | |
| CaO | | | 8.53 | | |
| SrO | | | | | 7.63 |
| $Al_2O_3$ | 1.91 | 1.94 | 1.94 | 1.97 | 1.88 |
| $Er_2O_3$ | | | | | |
| $MnO_2$ | | | | | |
| $Dy_2O_3$ | | | | | |
| $Tb_4O_7$ | | | | | |
| $Pr_2O_3$ | | | | | |
| $Nd2O_3$ | 2.52 | | | | |
| Σ | 100.0000 | 100.0000 | 100.0000 | 100.0000 | 100.0000 |
| $T_g$/° C. | 459.8 | 457.9 | 460.6 | 454.9 | 455.6 |
| $T_s$/° C. | 1500 + 1500 | 1500 + 1500 | 1500 + 1500 | 1500 + 1500 | 1500 + 1500 |
| $t_s$/min. | 60 + 60 | 60 + 60 | 60 + 60 | 60 + 60 | 60 + 60 |
| $T_{Kb}$/° C. | 480 | 480 | 480 | 480 | 480 |
| $t_{Kb}$/min | 10 | 10 | 10 | 10 | 10 |
| $T_{C1}$/° C. | 950 | 950 | 850 | 940 | 930 |
| $t_{C1}$/min. | 10 | 10 | 10 | 10 | 10 |
| $T_{C2}$/° C. | | | | | |
| $t_{C2}$/min. | | | | | |
| Main crystal phase (wt.-%) | $Li_2Si_2O_5$ | $Li_2Si_2O_5$ (68.7) | $Li_2Si_2O_5$ | $Li_2Si_2O_5$ | $Li_2Si_2O_5$ |
| Other crystal phases (wt.-%) | | | $Li_2SiO_3$ Quartz $CaSiO_3$ | $Li_2SiO_3$ | $Li_2SiO_3$ |
| Kic (MPa * $m^{0.5}$) | | | | | |
| Chem. stability (µg/$cm^2$) | | | | | |
| $\sigma_{Biax}$ (MPa) | | | | | |

TABLE I-continued

| Composition | Example no. 41 Wt.-% | 42 Wt.-% | 43 Wt.-% | 44 Wt.-% | 45 Wt.-% | 46 Wt.-% | 47 Wt.-% | 48 Wt.-% |
|---|---|---|---|---|---|---|---|---|
| $SiO_2$ | 74.17 | 76.92 | 78.73 | 79.05 | 79.56 | 78.73 | 87.82 | 79.7159 |
| $Li_2O$ | 21.69 | 15.93 | 16.30 | 16.37 | 16.48 | 16.3 | 7.94 | 16.51 |
| CuO | 0.08 | 0.30 | 0.31 | 0.30 | 0.08 | 0.45 | 0.28 | 0.0015 |
| SnO | 0.13 | 0.51 | 0.52 | 0.51 * | 0.13 * | 0.77 * | 0.48 | 0.0026 |
| $K_2O$ | 1.89 | 1.77 | 1.81 | 1.82 | 1.8 | 1.81 | 1.68 | 1.81 |
| $Al_2O_3$ | 2.04 | 1.93 | 1.96 | 1.95 | 1.95 | 1.94 | 1.80 | 1.96 |
| $B_2O_3$ | | 2.64 | | | | | | |
| F | | | 0.37 | | | | | |
| Σ | 100.0000 | 100.0000 | 100.0000 | 100.0000 | 100.0000 | 100.0000 | 100.0000 | 100.0000 |
| $T_g$/° C. | 433.6 | 457.9 | 453.6 | | | | 489.3 | 462.9 |
| $T_s$/° C. | 1500 + 1500 | 1500 + 1500 | 1500 + 1500 | 1650 + 1650 | 1650 + 1650 | 1650 + 1650 | 1650 + 1650 | 1650 |
| $t_s$/min. | 60 + 60 | 60 + 60 | 60 + 60 | 60 + 60 | 60 + 60 | 60 + 60 | 60 + 60 | 60 |
| $T_{Kb}$/° C. | 450 | 470 | 480 | 480 | 480 | 480 | 520 | 480 |
| $t_{Kb}$/min | 10 | 10 | 10 | 10 | 10 | 10 | 10 | 10 |
| $T_{C1}$/° C. | 950 | 550 | 550 | 950 | 950 | 950 | 930 | 950 |
| $t_{C1}$/min. | 10 | 60 | 60 | 10 | 10 | 10 | 10 | 10 |
| $T_{C2}$/° C. | | 900 | 900 | | | | | |
| $t_{C2}$/min. | | 1 | 1 | | | | | |
| Main crystal phase (wt.-%) | $Li_2SiO_3$ | $Li_2SiO_3$ | $Li_2Si_2O_5$ | $Li_2Si_2O_5$ | $Li_2Si_2O_5$ | $Li_2Si_2O_5$ | $Li_2Si_2O_5$ | $Li_2Si_2O_5$ |
| Other crystal phases (wt.-%) | $Li_2Si_2O_5$ | $Li_2Si_2O_5$ Quartz | $Li_2SiO_3$ Quartz | | | | Quartz cristobalite | |
| Kic (MPa * $m^{0.5}$) | | | | 3.1 ± 0.1 | 3.0 ± 0.1 | | | |
| Chem. stability (μg/$cm^2$) | | | | | | | | |
| $\sigma_{Biax}$ (MPa) | | | | 595 ± 100 | 461 ± 26 | | | |

* SnO was used as starting material

The invention claimed is:

1. A lithium silicate glass ceramic, comprising 0.001 to 1.0 wt.-% copper, calculated as CuO, wherein the copper is at least partially present as elemental copper, and wherein the elemental copper is present in the form of particles which have an average size D50 of 0.1 to 100 nm.

2. A lithium silicate glass ceramic comprising 0.001 to 1.0 wt.-% copper, calculated as CuO, wherein the copper is at least partially present as elemental copper, and wherein the elemental copper is present in the form of particles which have an average size D50 of 0.1 to 100 nm, wherein the lithium silicate glass ceramic is in a form of a dental restoration and wherein the dental restoration comprises a bridge, inlay, onlay, veneer, abutment, partial crown, crown or facet.

3. The lithium silicate glass ceramic according to claim 1, which comprises 0.05 to 1.5 wt.-% tin, calculated as SnO.

4. The lithium silicate glass ceramic according to claim 1, which comprises 67.0 to 89.0 wt.-% $SiO_2$.

5. The lithium silicate glass ceramic according to claim 1, which comprises 7.0 to 22.0 wt.-% $Li_2O$.

6. The lithium silicate glass ceramic according to claim 1, which comprises 0.1 to 6.0 wt.-% $Al_2O_3$.

7. The lithium silicate glass ceramic according to claim 1, which comprises 1.0 to 11.0 wt.-% oxide of monovalent elements Me 20 selected from the group of $K_2O$, $Na_2O$, $Rb_2O$, $Cs_2O$ and mixtures thereof.

8. The lithium silicate glass ceramic according to claim 1, which comprises 0 to 11.0 wt. % $K_2O$.

9. The lithium silicate glass ceramic according to claim 1, which comprises 0 to 10.0 wt.-% oxide of divalent elements $Me^{II}O$ selected from the group of CaO, MgO, SrO, ZnO and mixtures thereof.

10. The lithium silicate glass ceramic according to claim 1, which comprises 0.1 to 12.0 wt.-% oxide of trivalent elements $Me^{III}_2O_3$ selected from the group of $Al_2O_3$, $B_2O_3$, $Y_2O_3$, $La_2O_3$ and mixtures thereof.

11. The lithium silicate glass ceramic according to claim 1, which comprises lithium disilicate or lithium metasilicate as main crystal phase.

12. The lithium silicate glass ceramic according to claim 1, which comprises at least 10 wt.-% lithium metasilicate crystals.

13. The lithium silicate glass ceramic according to claim 1, comprising at least 50 wt.-% lithium disilicate crystals.

14. A starting glass, which comprises the components of the lithium silicate glass ceramic according to claim 1.

15. The starting glass according to claim 14, which comprises nuclei for the crystallization of lithium metasilicate and/or lithium disilicate.

16. A process for producing the lithium silicate glass ceramic according to claim 1, wherein a starting glass comprising 0.001 to 1.0 wt.-% copper, calculated as CuO, is subjected to at least one heat treatment in the range of 500 to 1050° C.

17. The process according to claim 16, wherein (a) the starting glass is subjected to a heat treatment at a temperature of 400 to 600° C. to form starting glass with nuclei, and (b) the starting glass with nuclei is subjected to a heat treatment at a temperature of 500 to 1050° C. to form the lithium silicate glass ceramic.

18. A process for producing a dental restoration comprising a bridge, inlay, onlay, veneer, abutment, partial crown, crown or facet, wherein the lithium silicate glass ceramic or a starting glass comprising the components of the lithium silicate glass ceramic according to claim 1, is given a shape of the dental restoration by machining.

* * * * *